3,332,849
METHOD OF AND APPARATUS FOR CONTROLLING A NUCLEAR REACTOR VAPOR GENERATING PLANT
Jakob Kägi, Winterthur, Switzerland, assignor to Sulzer Brothers Limited, Winterthur, Switzerland, a corporation of Switzerland
Filed Sept. 9, 1964, Ser. No. 395,121
Claims priority, application Switzerland, Sept. 13, 1963, 11,378/63
7 Claims. (Cl. 176—20)

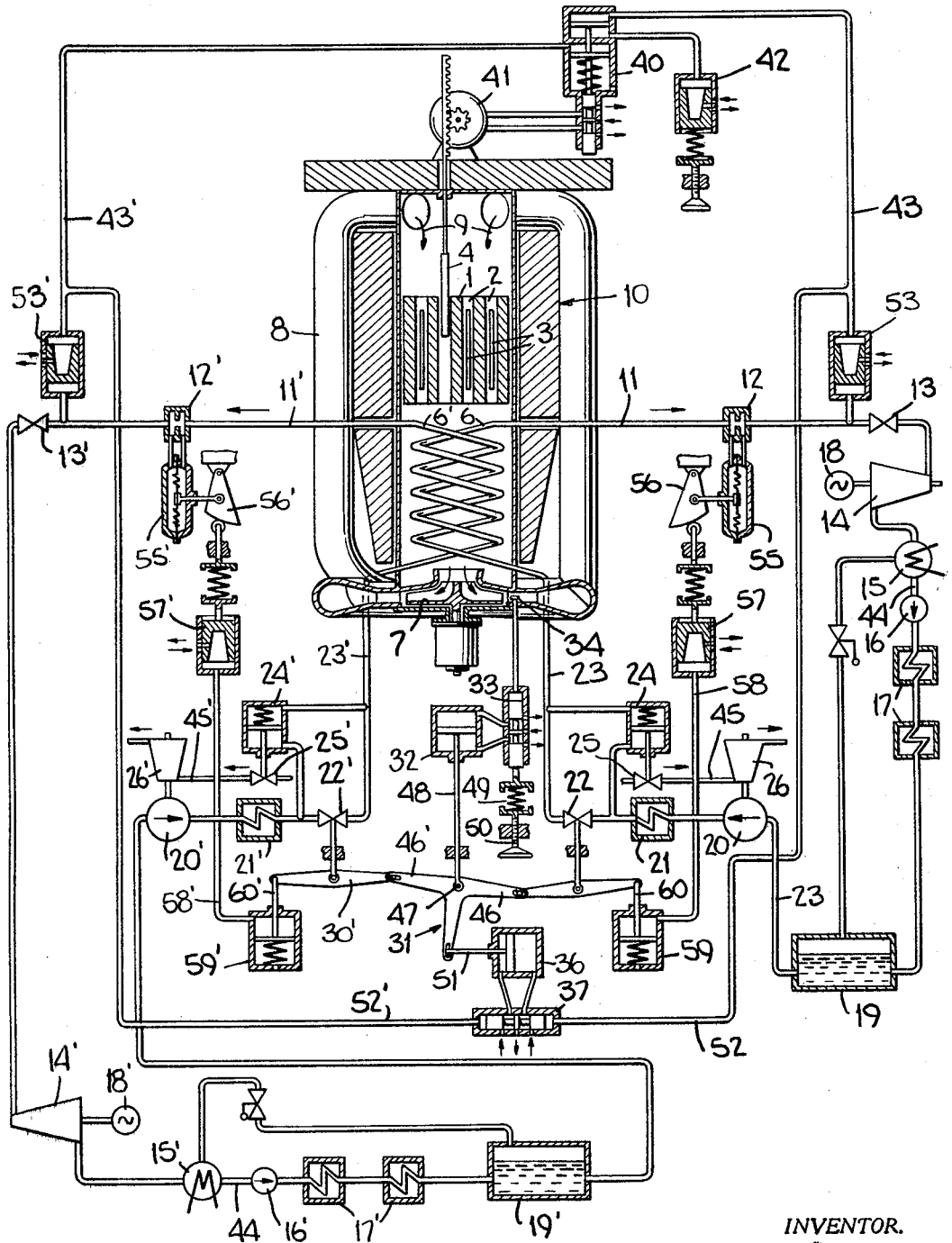

The present invention relates to a method of controlling a nuclear reactor plant through whose reactor flows a coolant which is heated thereby and which subsequently transfers heat to an operating medium flowing in two separate circuits for heating and vaporizing the medium. The invention also relates to apparatus for carrying out the method in a nuclear reactor plant wherein operating medium flows through two circuits and receives heat from a coolant flowing through the nuclear reactor and is heated and evaporated thereby, each operating medium circuit including a means for controlling the rate of flow of liquid operating medium which receives heat from the coolant.

In the method according to the invention the total rate of flow of operating medium in both circuits is influenced in response to the temperature of the coolant entering the reactor and the rates of flow in the individual conduits are coordinated on the basis of a comparison of the pressure of the vapor generated in the circuits for matching the vapor pressures in both circuits. The method according to the invention has been found particularly useful because it affords reliable maintenance of a constant temperature of the coolant entering the reactor, by simple means. Reliable maintenance of the temperature of the coolant entering the reactor favorably affects the operating behavior of the reactor because it avoids thermoshocks.

In a reactor plant according to the invention a temperature sensing device is provided at the inlet of the coolant into the reactor which device is operatively connected to means for adjusting the rate of flow of liquid operating medium in both circuits. A vapor pressure sensitive device is provided in the live vapor portion of each circuit, which devices are operatively connected to the respective rate of flow adjusting means in such manner that actuation of one rate of flow adjusting means in one direction simultaneously effects actuation of the second rate of flow adjusting means in the opposite direction.

In a modification of the method according to the invention the means for adjusting the rate of flow of liquid operating medium in the individual circuits are additionally actuated in response to the load on the respective circuit, for example in response to the rate of flow of live vapor in the respective circuit.

In another modification of the method according to the invention the heat output of the nuclear reactor is controlled by adjusting the position of at least one control rod in the reactor core in response to the sum of the live vapor pressures in the two operating medium circuits.

The novel features which are considered characteristic of the invention are set forth with particularity in the appended claims. The invention itself, however, and additional objects and advantages thereof will best be understood from the following description of embodiments thereof when read in connection with the accompanying drawing, the single figure of which is a diagrammatic part-sectional illustration of a plant according to the invention.

Referring more particularly to the drawing numeral 10 designates a nuclear reactor including a moderator body 1 provided with vertical channels 2 receiving fissionable material fuel rods 3 and control rods 4, only one control rod being shown for the sake of simplicity.

Tube systems 6 and 6' are placed below the body 1, each tube system forming part of an operating medium circuit which will be described later. The reactor 10 is cooled by a preferably gaseous medium which enters a chamber above the body 1 in the direction of arrows 9 and passes through the channels 2 whereby it absorbs heat liberated by the fuel rods 3. The heated coolant flows around the tube system 6 and 6', transferring heat to the latter. A circulating means 7, for example a blower, is located below the tube systems 6 and 6' for returning the coolant through ducts 8 to the chamber above the body 1.

A vaporizable liquid, preferably water, is preheated and evaporated, and superheated, if desired, in the tube systems 6 and 6'. The vapor generated in the system 6 flows through a live vapor conduit 11 past a valve 13 into a turbine 14 wherein the vapor is expanded. The turbine 14 drives an electric generator 18. The turbine exhausts into a condenser 15 wherein the vapor is condensed, the condensate flowing through a conduit 44 to a container 19. A condensate pump 16 and two preheaters 17, which are preferably heated in the conventional manner by vapor tapped from the turbine 14, are interposed in the conduit 44. The container 19 is connected to the tube system 6 by a pipe 23 wherein a feed pump 20, a preheater 21 and a feed valve 22 are interposed.

The feed pump 20 is driven by an auxiliary steam turbine 26 in whose steam supply pipe 45 a valve 25 is provided which valve is actuated by a pressure difference transmitter 24 which is connected to the pipe 23 upstream and downstream of the feed valve 22. The pressure difference transmitter 24 influences through valve 25 the steam admitted to the auxiliary turbine 26 and, therefore, the speed of the turbine 26 and of the feed pump 20. In this way the pressure drop across the feed valve 22 is controlled. Therefore, there is a fixed relation between the liquid fed into the system 6 by the pump 20 and the flow area of the feed valve 22.

The tube system 6' forms part of a second circuit which is like the circuit of which the tube system 6 forms a part. Like elements of both circuits are designated by like numerals, the numerals designating elements of the second circuit being primed.

Each of the feed valves 22 and 22' is connected to a two-arm lever 30, 30', respectively. The levers 30, 30' have arms directed toward each other and whose ends are pivotally connected to arms 46, 46', respectively, of a three-arm lever 31. The fulcrum 47 of the latter is supported by a piston rod 48 of a servomotor 32 which is controlled by a piston valve 33. At one end of the piston of the valve 33 acts the pressure produced by a temperature sensitive device 34 connected to the duct 8 downstream of the circulating device 7 and measuring the temperature of the coolant entering the reactor 10. On the opposite end of the piston of the valve 33 acts a spring 49 whose initial tension can be adjusted by revolving a threaded spindle 50. A change of the temperature of the coolant passing the device 34 moves the valve 33 to effect axial movement of the piston rod 48 and displacement of the three-arm lever 31. This causes swinging of the levers 30 and 30' and actuation of the feed valves 22 and 22' in the same direction so that the total rate of flow of liquid operating medium to the tube systems 6 and 6' is increased upon a rise of the coolant temperature, and conversely.

The third arm of the lever 31 is connected through a piston rod 51 to a servomotor 36 which is controlled by a piston valve 37. In the latter pressures corresponding to the pressure of the vapor or steam in the live steam pipes 11 and 11' are compared. For this purpose pipes 52 and 52' are connected to opposite sides of the valve 37 and are connected to spaces in cylinders 53 and 53', respectively, above control pistons inside the cylinders. On the opposite side of the last mentioned pistons acts the live steam pressure in the pipes 11 and 11', respectively. The pipes 52 and 52' are filled with a pressure medium. If the live steam pressures in the pipes 11 and 11' are not alike the piston of the valve 37 is moved to one side of its neutral position, for allowing flow of pressure fluid from one side of the piston of the servomotor 36 and supplying pressure fluid to the opposite side of the piston. This causes movement of the piston and swinging of the three-arm lever 31 around its fulcrum 47. This swinging movement of the lever 31 acts on the two-arm levers 30 and 30' and thereby on the feed valves 22 and 22' so that the latter are moved in opposite direction, i.e. if the opening of the valve 22 is increased the opening of the feed valve 22' is correspondingly decreased, and vice versa.

The pressures of the pressure medium effected by the pistons in the cylinders 53 and 53' act not only on the piston valve 37 but are also transmitted through pipes 43 and 43' to a device 40 wherein the pressures of the pressure medium in the pipes 43 and 43' are added, the device 40 including means for controlling flow of pressure medium to and from a hydraulic, rotatable servomotor 41. The latter adjusts the position of a control rod 4 of the nuclear reactor whereby, depending on the extent of movement of the control rod 40 into the moderator body, the neutron flux and the output of the reactor are changed.

In each of the live steam pipes 11 and 11' a measuring orifice 12 and 12', respectively, is provided. The pressures downstream and upstream of these orifices act through pressure difference receives 55 and 55', respectively, on cams 56 and 56', respectively, for producing pressure signals corresponding to the rate of flow of the vapor or steam in the pipes 11 and 11', respectively, and acting on control pistons 57 and 57', respectively. These control pistons are connected through conduits 58 and 58' to servomotors 59 and 59', respectively, whose piston rods 60 and 60', respectively, are connected to the second arms of the levers 30 and 30', respectively, the first arms of the said levers being pivotally connected to the three-arm lever 31. In this way the supply of liquid operating medium to the tube systems 6 and 6' is additionally controlled in response to the rate of flow of vapor or steam from the systems 6, 6'.

During normal operation of the plant feed liquid, for example, feedwater is drawn by feed pumps 20 and 20' from the containers 19 and 19' and forced into the tube systems 6 and 6', respectively. The coolant heated in the nuclear reactor 10 supplies the heat for evaporating and superheating the operating medium in the tube systems 6 and 6' and the generated steam is expanded in the turbines 14 and 14' and thereafter condensed in the condensers 15 and 15'. The condensate is returned to the containers 19 and 19' by means of the condensate pumps 16 and 16', respectively.

If the temperature of the coolant passing the temperature sensitive device 34 rises the piston of the valve 33 is moved downward causing a downward movement of the piston rod 48 of the servomotor 32 and of the three-arm lever 31. By way of the two-arm levers 30 and 30' the feed valves 22 and 22' are both actuated in opening direction whereby the total amount of liquid supplied to the tube systems 6 and 6' is increased until the temperature of the coolant entering the reactor has the desired temperature. If the temperature of the coolant entering the reactor 10 drops, the temperature sensitive device 34 and elements connected thereto cause a reduction of the total rate of flow of operating medium into the tube systems 6 and 6'.

If the steam or vapor pressure in the pipe 11 is greater than the pressure in the pipe 11' the corresponding pressures in the pressure pipes 52 and 52' will also be different and the piston of the valve 37 is moved to the left. This effects movement to the right of the piston rod 51 of the servomotor 36 and swinging of the three-arm lever 31 around its fulcrum 47 in counterclockwise direction whereby the lever 30 is moved to decrease the opening of the feed valve 22 whereas the lever 31' causes an increase of the opening of the feed valve 22'. Therefore, the rate of flow of liquid into the tube system 6 is reduced and the rate of flow into the tube system 6' is correspondingly increased. The rates of flow of liquid to both systems are so coordinated that the pressures in the pipes 11 and 11' are equalized. If the pressure in the pipe 11' is greater than that in the pipe 11 the feed valves 22 and 22' are actuated in the opposite direction.

The flow meters 12, 55 and 12', 55' cause counterclockwise turning of the cam 56 and clockwise turning of the cam 56' when the rate of flow of vapor or steam is increased in the respective pipes 11, 11'. This causes increase of the pressure of the pressure medium below the control pistons 57 and 57' and downward movement of the piston rods 60 and 60' so that the feed valves 22 and 22' are acted in the opening direction through the levers 30 and 30', respectively. An increase of the rate of flow of live steam or vapor causes an increase of the rate of flow of liquid fed into the respective tube system. A decrease of live steam or vapor produced in one system causes decrease of the rate of flow into the respective tube system.

The adjustment of the feed valves 22 and 22' through the servomotors 59 and 59', which operates satisfactorily only at low pressures, i.e. lower than about 200 atm. or if a liquid separator is provided in each tube system, may be effected in response to other values corresponding to the vapor or load demand on the respective circuit, for example, in response to the load demand by the electrical system fed by the generators 18 and 18' or in response to a predetermined time table.

What is claimed is:

1. A method of controlling a nuclear reactor plant through the reactor of which a coolant flows and absorbs heat which is subsequently transmitted to an operating medium in two separate circuits in heat exchange relation to the heated coolant and being transformed from liquid to vapor state by the heat transmitted from the coolant, the method including:

measuring the temperature of the coolant entering the nuclear reactor, controlling the total rate of flow of liquid operating medium flowing in both circuits in heat exchange relation to the heated coolant, in response to the measured temperature of the coolant entering the nuclear reactor, measuring the pressure of the live vapor produced in each circuit and comparing said pressures, and controlling the rate of flow of liquid operating medium in each circuit in response to the result of said comparison for equalizing the vapor pressure in both circuits.

2. A method as defined in claim 1 including measuring the load demand on each circuit and additionally controlling the rate of flow of liquid operating medium flowing in each circuit in heat exchange relation to the heated coolant, in response to the load demand on the respective circuit.

3. A method according to claim 1 including measuring the rate of flow of the live vapor in each circuit and additionally controlling the rate of flow of liquid operating medium flowing in each circuit in heat exchange relation to the heated coolant, in response to the rate of flow of live vapor in the respective circuit.

4. A method of controlling a nuclear reactor plant through the reactor of which a coolant flows and absorbs heat which is subsequently transmitted to an operating medium flowing in separate circuits in heat exchange relation with the heated coolant and being transformed from liquid to vapor state by the heat transmitted from the coolant, the heat output of the reactor being controlled by adjusting the position of at least one control rod, the method including:

measuring the temperature of the coolant entering the nuclear reactor, controlling the total rate of flow of liquid operating medium flowing in both circuits in heat exchange relation to the heated coolant, in response to the measured temperature of the coolant entering the nuclear reactor, measuring the pressure of the live vapor produced in each circuit and comparing said pressures, controlling the rate of flow of liquid operating medium in each circuit in response to the result of said comparison for equalizing the vapor pressure in both circuits, adding the pressures of the live vapor in both circuits, and adjusting the position of the control rod in response to the sum of the pressures of the live vapor in both circuits.

5. In a nuclear reactor plant having a nuclear reactor, a coolant passing through said reactor for cooling the reactor, and means forming two circuits for conducting an operating medium, each circuit forming means including a tubular portion receiving an operating medium in liquid state and placed in heat exchange relation with said coolant for receiving heat from the coolant heated by cooling the reactor, for evaporating the liquid operating medium:

means for measuring the temperature of the coolant entering the reactor, means interposed in each of said circuit forming means and operatively connected to said temperature measuring means for controlling the rate of flow of liquid operating medium into said tubular portions in response to the temperature of the coolant entering the reactor, means for measuring the pressure of the live vapor in each of said circuit forming means, and means operatively connecting said pressure measuring means to said means for controlling the rate of flow of liquid operating medium in the respective circuit forming means, said means operatively connecting said pressure measuring means to said rate of flow controlling means including means for actuating one of said rate of flow controlling means for increasing the rate of flow of liquid operating medium to the respective tubular portion when the second rate of flow controlling means decreases the rate of flow of liquid operating medium to the respective tubular portion, and vice versa.

6. In a nuclear reactor plant as defined in claim 5:

means for measuring the rate of flow of live vapor produced in and flowing from each of said tubular portions, said rate of flow of live vapor measuring means being individually operatively connected to said means for controlling the rate of flow of liquid operating medium into the respective tubular portion for additionally controlling the rate of flow of liquid operating medium to the respective tubular portion in response to the rate of vapor flow from the respective tubular portion.

7. In a nuclear reactor plant having a nuclear reactor including at least one control rod for changing the heat output of the reactor by adjusting the position of the control rod, and means for adjusting the position of the control rod; a coolant passing through said reactor for cooling the reactor, and means forming two circuits for conducting an operating medium, each circuit forming means including a tubular portion receiving operating medium in liquid state and placed in heat exchange relation with said coolant for receiving heat from the coolant heated by cooling the reactor, for evaporating the liquid operating medium;

means for measuring the temperature of the coolant entering the reactor, means interposed in each of said circuit forming means and operatively connected to said temperature measuring means for controlling the rate of flow of liquid operating medium into said tubular portions in response to the temperature of the coolant entering the reactor, means for measuring the pressure of the live vapor in each of said circuit forming means, means operatively connecting said pressure measuring means to said means for controlling the rate of flow of liquid operating medium in the respective circuit forming means, said means operatively connecting said pressure measuring means to said rate of flow controlling means including means for actuating one of said rate of flow controlling means for increasing the rate of flow of liquid operating medium to the respective tubular portion when the second rate of flow controlling means decreases the rate of flow of liquid operating medium to the respective tubular portion, and vice versa, and means operatively connected to said pressure measuring means for adding the pressures of the live vapor measured in each circuit forming means, said pressure adding means being operatively connected to said means for adjusting the position of said control rod in response to the sum of the pressures of the live vapor in both circuit forming means.

References Cited

UNITED STATES PATENTS 3,170,846   2/1965   Blumberg _____ 176—59

FOREIGN PATENTS 837,786   6/1960   Great Britain.
878,436   9/1961   Great Britain.
985,647   3/1965   Great Britain.

CARL D. QUARFORTH, *Primary Examiner.*

LEON D. ROSDOL, *Examiner.*

H. E. BEHREND, *Assistant Examiner.*